United States Patent [19]

Busch-Vishniac et al.

[11] 4,429,191
[45] Jan. 31, 1984

[54] ELECTRET TRANSDUCER WITH VARIABLY CHARGED ELECTRET FOIL

[75] Inventors: Ilene J. Busch-Vishniac, Highland Park; Robert L. Wallace, Jr., Warren; James E. West, Plainfield, all of N.J.

[73] Assignee: Bell Telephone Laboratories, Incorporated, Murray Hill, N.J.

[21] Appl. No.: 323,669

[22] Filed: Nov. 20, 1981

[51] Int. Cl.³ .......................................... H04R 19/00
[52] U.S. Cl. .......................... 179/111 E; 179/111 R; 29/592 E; 307/400
[58] Field of Search .......... 179/1 DM, 111 E, 111 R; 307/400; 29/592 R, 592 E, 594

[56] References Cited

U.S. PATENT DOCUMENTS

| | | |
|---|---|---|
| 3,588,382 | 6/1971 | Reedyk. |
| 3,895,194 | 7/1975 | Fraim .......................... 179/111 E X |
| 3,896,274 | 7/1975 | Fraim et al. ..................... 179/111 E |
| 4,192,977 | 3/1980 | Stamm ............................ 179/111 E |
| 4,249,043 | 2/1981 | Morgan et al. ................. 179/111 E |

OTHER PUBLICATIONS

"Electrostatic Microphones with Electret Foil", G.M. Sessler, *The Journal of Acoustical Society of America*, Sep. 1963, vol. 35, No. 9, pp. 1354–1357.

*Primary Examiner*—A. D. Pellinen
*Assistant Examiner*—Danita R. Byrd
*Attorney, Agent, or Firm*—Robert O. Nimtz; Jack S. Cubert

[57] ABSTRACT

An electret transducer for producing a highly directional response characteristic comprises a backplate (18) and, superimposed thereon, an electrostatically charged electret foil (10). The electrostatic charge varies according to a predetermined relationship. The sensitivity of the electret transducer, at any point thereon, is directly proportional to the electrostatic charge on the electret foil at that point.

11 Claims, 18 Drawing Figures

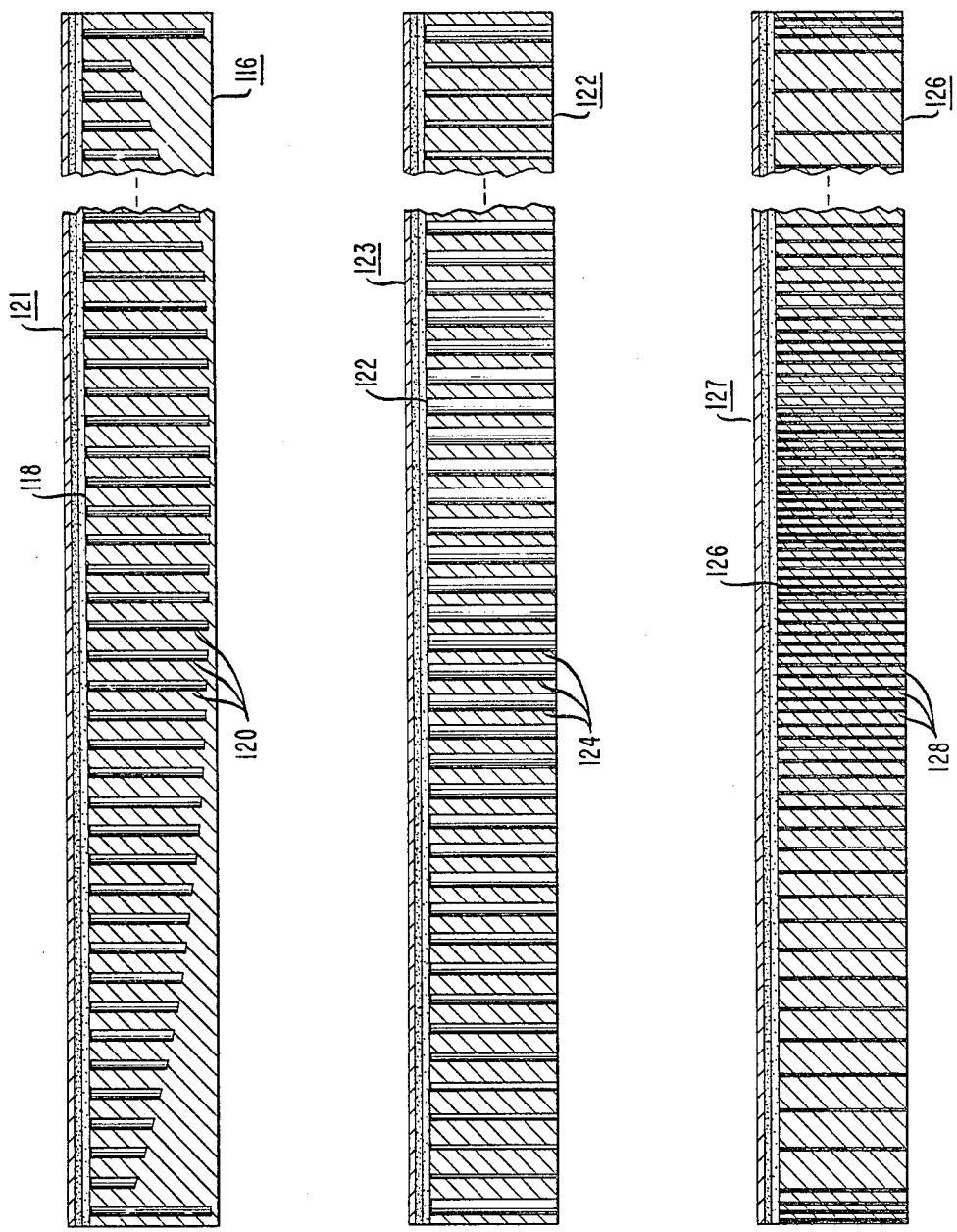

ELECTRET TRANSDUCER WITH VARIABLY CHARGED ELECTRET FOIL

TECHNICAL FIELD

This invention relates to acoustic systems and, in particular, to electret transducers for producing directional response characteristics.

BACKGROUND OF THE INVENTION

Acoustic arrays comprising a plurality of discrete microphones are useful in producing directional response characteristics, as shown in the copending application of R. L. Wallace, Ser. No. 104,375, filed Dec. 17, 1979. It is necessary, however, that each microphone be located precisely during construction of the array. Imprecise location of the microphones from desired positions result in substantial degradation of the array response characteristic.

SUMMARY OF THE INVENTION

The aforesaid problems with imprecise location of microphones during the construction of an acoustic array are eliminated by the use of a single strip electret transducer. The response characteristic obtained from the electret transducer comprises a main lobe and a plurality of sidelobes below a predetermined threshold, much the same as the microphone array described above.

In accordance with the illustrative embodiment of the present invention, an electret transducer comprises a metalized backplate, and superimposed thereon, an electrostatically charged electret foil. The electrostatic charge varies along the length of the electret foil according to a predetermined relationship. The sensitivity of the electret foil, at any point thereon, is directly proportional to the electrostatic charge thereat.

In accordance with another embodiment of the present invention, the aforesaid electret foil is fastened to the metal surface of the backplate. A second foil is suspended over the electret foil and supported structurally by insulating elements. The electrostatic charge of the second electret foil varies according to a predetermined relationship.

BRIEF DESCRIPTION OF THE DRAWINGS

FIGS. 11, 12 and 13 show embodiments of electret transducers made by varying the effective air gap;

DETAILED DESCRIPTION

Figure 1:
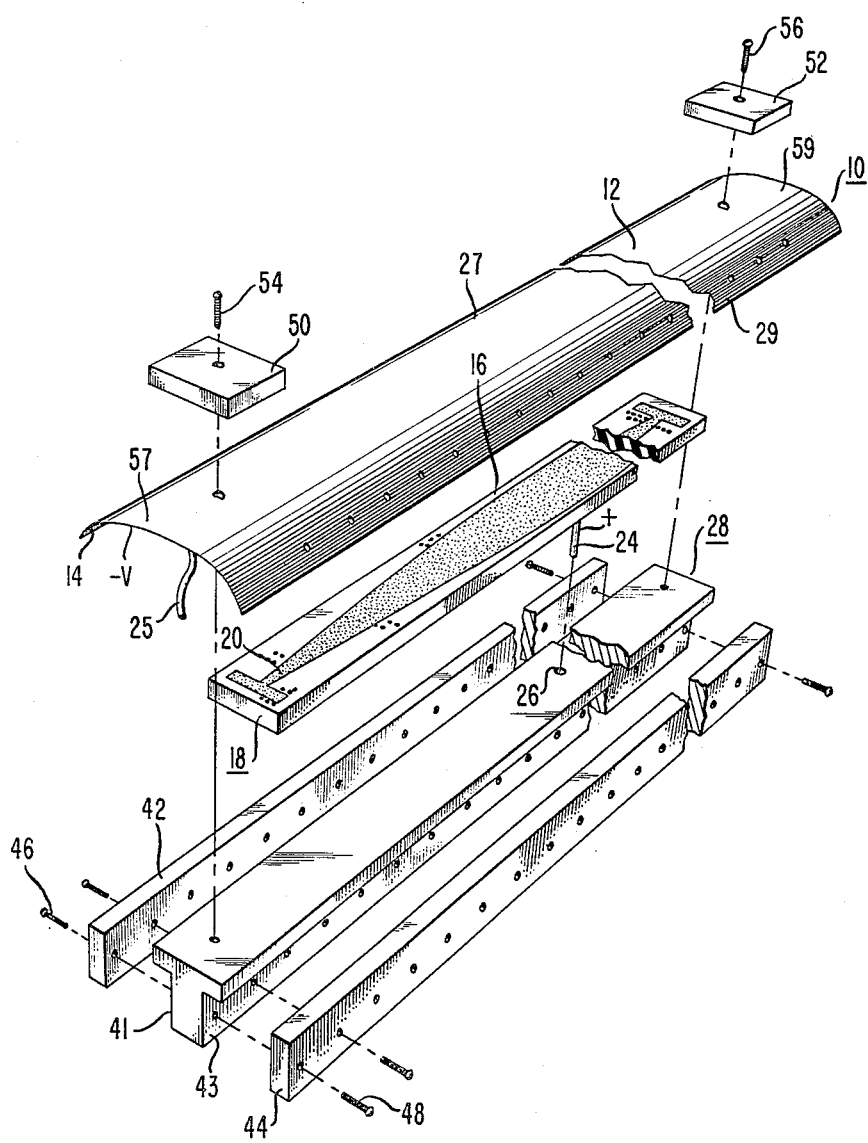
FIG. 1 shows a disassembled electret transducer.

Referring to FIG. 1, there is shown an electret transducer with its component parts disassembled. There is shown an electret foil 10 comprising two layers: an upper metal layer 12, and a lower synthetic resin polymer (such as FEP TEFLON ®) layer 14. The polymer layer 14 is electrostatically charge to a predetermined value. In one application, the electrostatic charge is uniform over the charged area at $-275\pm3$ volts. The metal layer 12, in this application, is about two thousand Angstroms thick; the polymer layer is about 25 microns thick. Also, in the aforesaid application, the electret foil is $21\frac{1}{2}$ centimeters long and $2\frac{1}{2}$ centimeters wide.

The exposed surface of polymer layer 14 of the aforesaid electret foil 10 makes direct contact with the rough surface 16 of a selectively metalized backplate 18. Selective metalization is obtained by depositing a layer of metal on the naturally rough surface 16 of the backplate 18, so that the width, w, of the metal layer varies along the length of the backplate 18 as a function of the normalized displacement of any point along the length of the backplate from its center; in accordance with the relationship $$\frac{J_1[j\nu(1-\xi^2)^{\frac{1}{2}}]}{(1-\xi^2)^{\frac{1}{2}}J_1(j\nu)}, \text{ for } |\xi| < L \quad (1)$$

$$K, \text{ for } L \leq |\xi| \leq 1 \quad (2)$$

where,
$J_1$ = Bessel function of the first kind;
$j = (-1)^{\frac{1}{2}}$;
$\nu = \ln[r + (r^2-1)^{\frac{1}{2}}]$;
r = ratio of amplitude of the main lobe to the sidelobe threshold level in the response characteristic, to be described with reference to FIG. 5, hereinbelow;
$\xi$ = normalized displacement of any point on the backplate from the center of the backplate; and
L = normalized displacement of the backplate beyond which the width of the metal layer is a constant, K.

For a constant charge density, constant air gaps and constant foil thickness, the sensitivity of the electret transducer at any point along its length is directly proportional to the width of the metal layer 16 on the backplate 18 at that point.

Alternatively, layer 12 of the aforesaid electret foil 10 is selectively metalized so that the width of the metal layer varies along the length of the electret foil 10 according to the aforesaid relationships (1) and (2). In this embodiment of the present invention, the metal surface 16 of backplate 18 has uniform width along the length of the backplate 18. For a constant charge density, constant air gaps, and constant oil thickness, the sensitivity of the electric transducer at any point along its length is directly proportional to the width of the metal layer 12 of the electret foil 10 at that point. The response characteristic obtained is illustrated by the response characteristic shown in FIG. 5.

Figure 5:
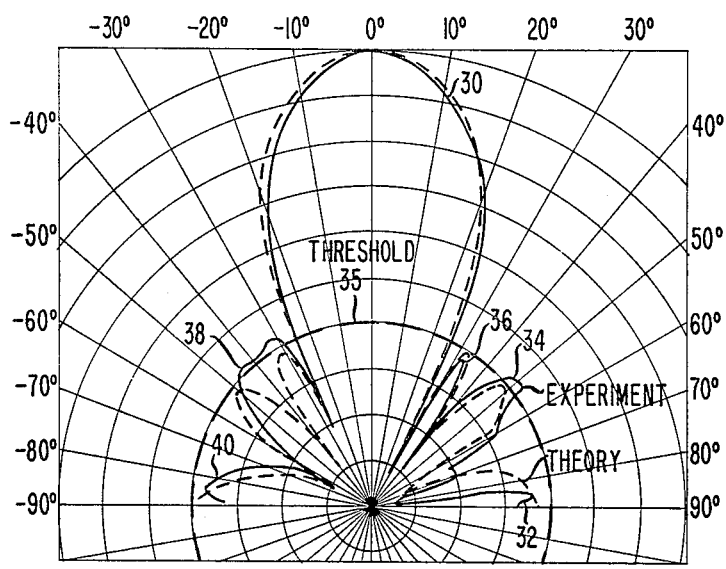
FIG. 5 shows a response characteristic of the electret transducer of FIG. 3.

Referring briefly to FIG. 5, there is shown the overall response characteristic of the electret transducer for 5067 Hz. The response characteristic, as experimentally determined, comprises one main lobe 30 and a plurality of sidelobes 32,34,36,38,40, each being at least 30 dB below the aforesaid main lobe 30. Other sidelobe patterns will be obtained for different frequencies. In each case, however, the sidelobe or sidelobes will be at or below threshold 35. The corresponding response characteristic, theoretically determined, is shown in broken lines. The ratio, r, of the amplitude of the main lobe 30 to the threshold 35, i.e., the sidelobe amplitude, is used as stated in the aforesaid relationships, (1) and (2) to determine the width of the metal layer.

Figure 2:
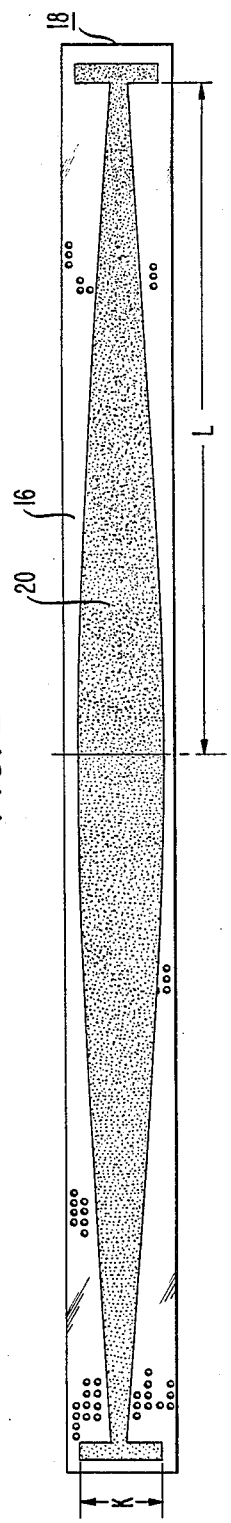
FIG. 2 shows a selectively metalized backplate useful in the electret transducer of FIG. 1.

Referring to FIG. 2 briefly, there is shown a plan view of the backplate 18 of FIG. 1. The aforesaid rough surface 16 of the backplate 18 comprises the metal layer 20 deposited by vaporization, or some other suitable method, on the surface 16 of the backplate 18. The backplate 18 may be made of circuit board material, often with holes therethrough, or some other electrically nonconductive material.

The width of the metal layer 20 is defined by the aforesaid relationships (1) and (2). At points along the length of the metal layer 20, equidistant from and on opposite sides of the center, the width of the metal layer is the same. Beyond a predetermined, normalized length, L, of the metal layer 20, the width remains a constant, K, at each end of the metal layer 20.

Referring again to FIG. 1, a metal post 24, making contact with the metal layer 20 on the surface 16 of backplate 18, provides a positive electrical lead to a connector (not shown). Likewise, lead 25, making contact with the metal layer of the electret foil 12, provides a neutral (or ground) electrical lead to the aforesaid connector (not shown). By this means, the acoustic signals impinging on the aforesaid electret transducer are converted to electrical signals, suitable for electrical transmission.

The aforesaid post 24 mates with orifice 26 in a structural member 28, made with brass in one application, for supporting the backplate 18. The electret foil 10 is superimposed on the backplate 18, the polymer layer 14 of the electret foil 10 making direct contact with the metalized rough surface 16 of the backplate 18. The longitudinal sides 27 and 29 of the electret foil 10 are pressed against the sides 41 and 43, respectively, of the structural support member 28 by clamps 42 and 44. A plurality of set screws 46,48 hold the clamps 42 and 44 in place. Likewise, washers 50,52 and set screws 54,56 hold the ends 57,59 of the electret foil 10 rigidly against the structural support member 28.

The assembled electret transducer may be supported vertically by sliding end 57 into a pedestal (not shown). In another arrangement, the electret transducer may be suspended by end 57,59 or both 57 and 59 from a ceiling. In yet another arrangement, the electret transducer may be placed on a wall. In each case, the electret transducer is positioned in such a way that the main lobe 30 of FIG. 5 spans a targeted location.

Figure 3:
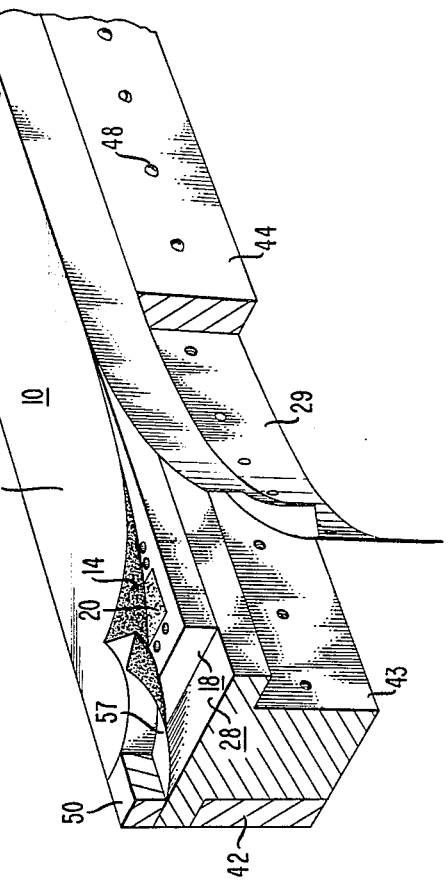
FIG. 3 shows an isometric view of a part of the assembled electret transducer of FIG. 1.

Referring to FIG. 3, there is shown an isometric view of a section of the assembled electret transducer. The same indicia as in FIGS. 1 and 2 are used for ease in reference.

Figure 4:
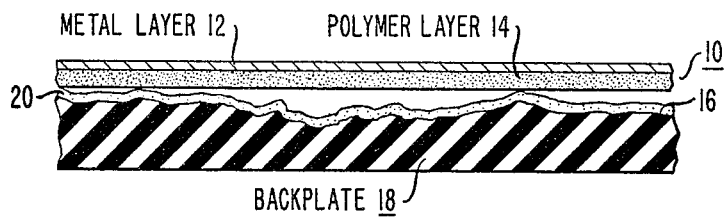
FIG. 4 shows an enlarged view of the contact between the electret foil and the backplate in the electret transducer of FIG. 1.

Referring to FIG. 4 there is shown a magnified view of the contact between the electret foil 10 and the backplate 18 of FIG. 1. The polymer layer 14 of the electret foil 10 makes direct contact with the rough surface 16 of backplate 18. Because of the natural roughness of the surface 16 of backplate 18, there will be several natural ridges therein for making direct contact with the foil 10, thereby preventing resonant motion in the aforesaid foil 10. Prevention of resonant motion is necessary for avoiding spectral peaks in the frequency response characteristic of the electret transducer. The uneven surface 16 provides the necessary air gap between the backplate 18 and the electret foil 10.

Figure 6:
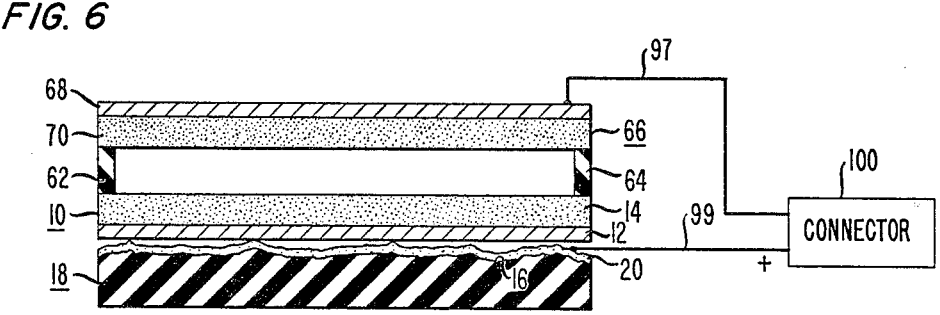
FIG. 6 shows a different embodiment of the electret transducer of FIG. 1.

Referring to FIG. 6, there is shown another embodiment of the present invention. Electret foil 10, comprising polymer layer 14 and metal layer 12, makes direct contact with backplate 18, comprising a metalized rough surface 16. Furthermore, the metal layer 12 makes direct contact with the metalized layer 20. Polymer layer 14 is electrostatically charged to a preselected voltage level.

Suspended over the electret foil 10 is a second foil 66, comprising a metal layer 68 and a polymer layer 70. Structurally, two insulated end stops 62 and 64 separate polymer layer 70 of the second foil 66 from the polymer layer 14 of electret foil 10. Two variations are possible by varying either the width of the metal layers 16 and 12, or the width of the metal layer 68 according to the aforesaid relationships (1) and (2) while keeping the width of the remaining metal layers uniform along the entire length of the layer. In each case, the response characteristic obtained is illustrated by the aforesaid response characteristic: one main lobe and a plurality of sidelobes at or below a predetermined threshold level, as in FIG. 5, hereinabove.

As stated hereinabove, the sensitivity of the electret transducer at any point along its length is directly proportional to the width of the varying metal layer of the electret transducer at that point. The width of the varying metal layer of the electret transducer, in accordance with the present invention, is given by the aforesaid relationships (1) and (2). The sensitivity $\psi(x)$ of the transducer at any distance, along its length, from the center of the electret transducer is given by the relationship $$\psi(x) = \frac{4\pi\sigma(x)S_{leff}(x)S(x)w(x)}{p_oA[\epsilon_oS(x) + \epsilon S_1(x)]} \quad (3)$$

where, $\psi(x)$ = sensitivity of the electret transducer at a distance x from the center thereof;

$\sigma(x)$ = the spatial charge distribution;

$S_{leff}(x)$ = the effective air gap thickness, to be described more fully hereinbelow;

$S_1(x)$ = the actual air gap thickness, to be described more fully hereinbelow;

$w(x)$ = width of the metal layer, stated by the aforesaid relationships (1) and (2);

$p_o$ = atmospheric pressure;

A = area of plane surface 16 of electret transducer in FIG. 2, hereinabove;

$\epsilon$ = permittivity of the electret foil, $\epsilon_o$ = permittivity of air; and $S(x)$ = thickness of the electret foil.

The aforesaid response characteristic is calculated, theoretically from the relationship $$R(\theta) = \frac{\int_{-1}^{1} \psi(x)e^{jkxSin\theta}dx}{\int_{-1}^{1} \psi(x)dx} \quad (4)$$

where, l = length of electret transducer from the center to one end;
−l = length of electret transducer from the center of the other end;
ψ(x) = sensitivity of the electret transducer at any distance x from the center thereof;
k = acoustic wavenumber; and
R(θ) = response of the electret transducer at any angle θ formed by the angle between an incident acoustic wave and the surface of the transducer.

Referring to FIG. 5 again, there is shown in solid lines 30,32 . . . 40 the response characteristic actually measured. The corresponding theoretically calculated response characteristic, from relationship (4), is shown in broken lines.

As stated in relationship (3), hereinabove, the sensitivity of the electret transducer is directly proportional to the width of the metal layer, the thickness of the electret foil, the thickness of the effective air gap, and the spatial charge distribution, i.e., the electrostatic charge on the electret foil. Thus by varying the aforesaid parameters one at a time, directly in accordance with the aforesaid relationships (1) and (2), the desired response characteristic shown in FIG. 5 is obtained. The sensitivity of the electret transducer is also inversely proportional to the thickness of the actual air gap. Thus, by varying the thickness of the actual air gap inversely; in accordance with the aforesaid relationships (1) and (2), the desired response characteristic shown in FIG. 5 is obtained.

Figure 7:
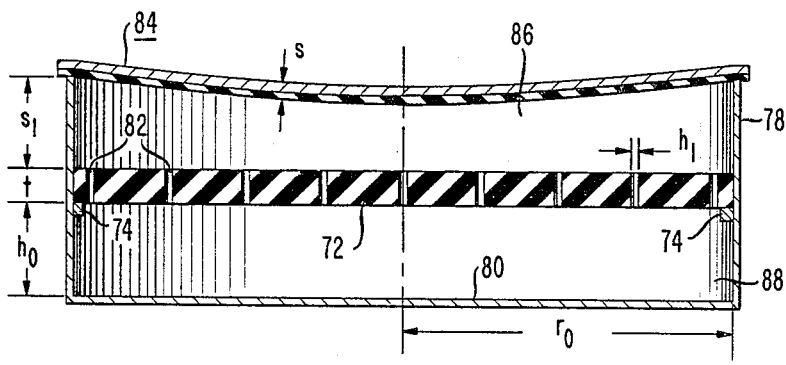
FIG. 7 shows an electret transducer, useful in distinguishing actual air gap from effective air gap.

Referring to FIG. 7, there is shown a device useful in understanding the aforesaid terms: actual air gap and effective air gap.

A backplate 72 having uniform thickness, t, rests on a ridge 74 machined into the cylinder 78 of radius, $r_o$, at a distance, $h_o$, from the bottom surface 80 thereof. The backplate 72 has perforated therethrough a plurality of apertures 82, each of diameter, $h_1$. Resting at the top of the cylinder 78 is an electret foil 84, of thickness, S, at a distance, $S_1$, from the top surface of backplate 72. Because of the weight of electret foil 84 and because of vibrations caused by sound impinging on the foil 84, there will be some insignificant variations in the distance, $S_1$, of the foil 84 from the backplate 72.

The actual air gap is the volume 86 of air between the electret foil 84 and the backplate 72. As stated hereinabove, because there is only an insignificant deformation in the electret foil 84, the thickness or depth of the actual air gap, $S_1$, is effectively constant. The actual air gap affects the electrical behavior of the system. The closer the electret foil 84 is to the backplate 72, the higher will be the output signal produced by electret foil 84.

The effective air gap is the sum of the volume of air in the back cavity 88, the volume of air in the plurality of apertures 82 and the actual air gap 86. The thickness or depth of the effective air gap is given by the relationship $$h_o + \frac{n h_1^2 t}{4 r_o^2} + S_1 \quad (5)$$

where,
$h_o$ = depth of the volume of air in the back cavity 88;
n = number of apertures 82;
$h_1$ = diameter of each of the apertures 82;
t = thickness of the backplate 72;
$r_o$ = radius of the cylinder 78; and
$S_1$ = thickness of the actual air gap.

The effective air gap affects the mechanical behavior of the electret transducer. The larger the effective air gap, the higher will be the deflection of the electret foil 84 for the same incident acoustic pressure thereon. Thus, the effective air gap determines the mechanical stiffness of the electret transducer but does not affect the electrical properties of the electret transducer.

Whereas FIG. 7 shows a cylinder 78 for teaching the meaning of the terms actual air gap and effective air gap, the same principles apply to the rectilinear electret transducer of FIG. 1.

Figure 8:
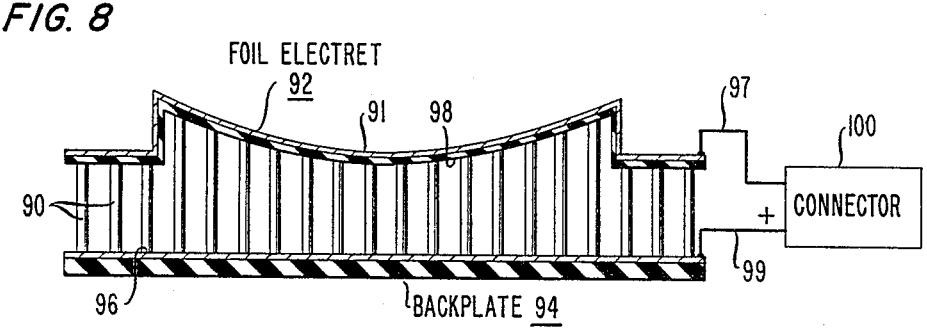
FIGS. 8, 9 and 10 show embodiments of electret transducers made by varying the actual air gap.

Referring to FIG. 8, there is shown an electret transducer manufactured by varying the thickness of the actual air gap along the length of the aforesaid electret transducer. The aforesaid variation in the thickness of the actual air gap is realized by the use of a plurality of posts 90 for separating the electret foil 92 from the backplate 94. The plurality of posts 90 have heights along the length of the electret transducer determined by the relationship $$d = \frac{(1 - \xi^2)^{\frac{1}{2}} J_1(j\nu)}{J_1[j\nu(1 - \xi^2)^{\frac{1}{2}}]}, \quad |\xi| \leq L \quad (6)$$

and $$d = 1/K, \quad L \leq |\xi| \leq 1 \quad (7)$$

That is, the sensitivity at any point along the electret transducer is inversely proportional to the height of the posts, at that point. At any point on the backplate 94, the posts are equally high along the width of the backplate 94 at that point. Alternatively, the posts are replaced by raised ridges which have constant height and run along the width of the backplate.

The backplate 94 has a thin metal layer as wide as the backplate 94 on the surface 96 thereof facing the electret foil 92. Alternatively, the entire backplate is made of metal. The electret foil 92 comprises a metal layer 91 and an electrostatically charged polymer layer 98. Polymer layer 98 faces the backplate. A negative lead 97 from the metal surface 91 of the electret foil 92 and a positive lead 99 from the metal surface 96 of the backplate 94 are terminated on a connector 100.

Figure 9:
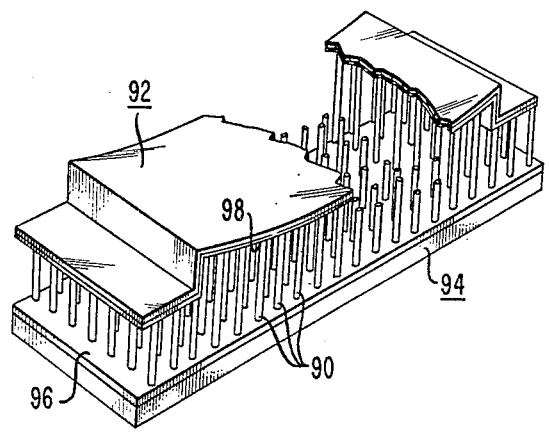

FIG. 9 shows an isometric view of a part of the electret transducer in FIG. 8, showing the details of the posts 90 on the backplate 94 with a portion of the electret foil 92 cut away.

In another embodiment (not shown) of the present invention, the metal layer 91 of the electret foil 92 is affixed to the metal layer of the backplate 96, so that the two metal layers make direct contact. Suspended over the electret foil 92 is a second foil (not shown), the two foils being separated by the aforesaid posts 90.

Figure 10:
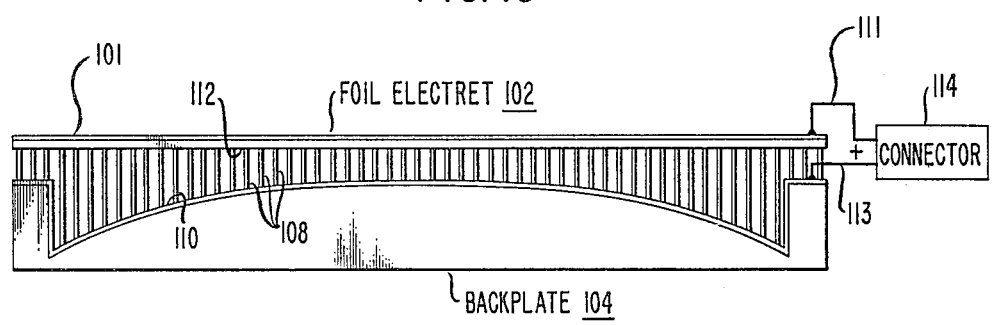

Referring to FIG. 10, there is shown another embodiment of an electret transducer obtained by varying the thickness of the actual air gap. The actual air gap thickness between the electret foil 102 and the backplate 104 is realized by varying the thickness of the backplate 104. The thickness of the electret foil 102, however, remains constant along the entire length thereof. Consequently, the heights of the plurality of posts 108 vary along the length of the aforesaid electret transducer. The posts 108 provide structural support for the electret foil 102. The thickness of backplate 104 varies along the length of the electret transducer according to the aforesaid relationships (6) and (7), i.e., the sensitivity of the electret transducer at any point thereon is inversely proportional to the thickness of the backplate thereat.

The surface 110 of backplate 104 is coated with a metal layer extending the entire width of backplate 104. Alternatively, the entire backplate 104 is made of metal. Electret foil 102 comprises two layers: a metal layer 101 and an electrostatically charged polymer layer 112. A neutral (or ground) lead 111 from the metal surface 101 of electret foil 102 and a positive lead 113 from the metal surface 110 of backplate 104 are terminated at a connector 114.

Alternatively, the metal layer 101 of the electret foil 102 is attached to the metal surface 110 of the backplate 104 so that the two metal layers are in direct contact. A second foil (not shown) is suspended over the backplate 104. This second foil is supported by the aforesaid posts 108.

In each electret transducer shown in FIGS. 8, 9 and 10, the response obtained therefrom is illustrated by the response characteristic in the aforesaid FIG. 5.

Referring to FIGS. 11, 12 and 13 there are shown three separate embodiments of electret transducers, in each case obtained by varying the effective air gap thickness. In each of the aforesaid three embodiments, there is an electret foil superimposed on a backplate, similar to the electret transducers in FIGS. 1 and 4, hereinabove. Because the invention is embodied, mainly in the backplate, only the backplate will be described.

Referring more particularly to FIG. 11, there are shown an electret foil 121 and a backplate 116. The aforesaid electret foil 121 is superimposed directly on backplate surface 118 which is naturally rough. A plurality of equal diameter holes 120 are drilled to various depths through surface 118 of backplate 116. Because the aforesaid electret foil 121 is placed directly on surface 118, the actual air gap thickness is substantially constant along the length of the backplate 116. Consequently, by referring to the aforesaid relationship (5), the effective air gap thickness is directly proportional to the depth of the holes 120.

The depths of the aforesaid holes are adjusted in equation (5) so that the effective air gap as a function of the displacement from the center $\xi$ along the length of the backplate is given by relationships (1) and (2). The sensitivity, $\psi(x)$, at any point along the electret transducer is directly proportional to the effective air gap thickness at that point. The sensitivity, $\psi(x)$, is stated by the aforesaid relationship (3). The response characteristic is calculated, theoretically, from the aforesaid relationship (4). The response as calculated from relationship (4) and as actually measured are illustrated by the response characteristics shown in FIG. 5, hereinabove.

Referring to FIG. 12, there are shown an electret foil 123 and a backplate 122 comprising a plurality of apertures 124 perforated therethrough, useful in realizing another electret transducer. The diameters of the apertures vary are selected so that the volume of air in the apertures and consequently the effective air gap thickness as a function of the displacement from the center $\xi$ along the length of the backplate is given by relationships (1) and (2).

Referring to FIG. 13, there are shown an electret foil 127 and a backplate 126 comprising a plurality of equal diameter apertures 128 perforated through the backplate 126. The effective air gap thickness is varied, by adjusting the number of apertures 128 across the width as a function of the displacement from the center $\xi$ along the length of the backplate according to relationships (1) and (2).

In another embodiment (not shown) of the present invention in which the effective air gap varies along the length of the electret transducer, the metal layer of the electret foil is placed directly in contact with the metal layer of the backplate. A second foil is suspended above the electret foil 121, 123 or 127, supported by insulating elements, such as shown in FIG. 6 by elements 62 and 64. In three separate realizations of this embodiment the effective air gap thickness is varied by varying the diameter, density, or depth of holes in the backplate, as shown in FIGS. 11, 12 and 13. Alternatively, the holes in FIGS. 11, 12 and 13 are replaced by grooves (not shown) whose breadth, density, or depth are selected to be a function of the displacement from the center $\xi$ along the length of the backplate according to relationships (1) and (2). These grooves run parallel to the backplate width.

Figure 14:
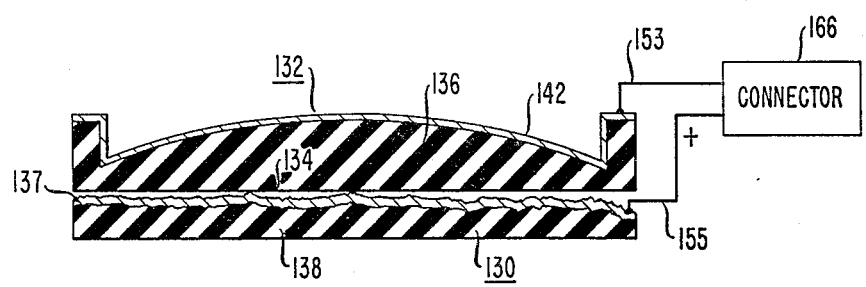
FIGS. 14 and 15 show embodiments of an electret transducer made by varying the thickness of the electret foil.

Referring to FIG. 14, there is shown an electret transducer comprising a backplate 130 of uniform thickness and an electret foil 132 of thickness selected to be a function of the displacement from the center $\xi$ along the length of the backplate according to the aforesaid relationships (1) and (2). Electret foil 132 comprises a polymer layer 136 and superimposed thereon, a metal layer 142. The polymer layer 136 has a flat surface 134 superimposed directly on a naturally rough surface 138 of a backplate 130. There is coated on surface 138 of the backplate 130 a thin metal layer. A neutral (or ground) lead 133 from the metal layer 142 and a positive lead 131 from the metal layer on surface 138 of backplate 130 are terminated at connector 140.

The sensitivity, $\psi(x)$, given by the aforesaid relationship (3) of the electret transducer in FIG. 14 at any point thereon is directly proportional to the thickness of the electret foil 132 at that point. The response, as calculated theoretically from the aforesaid relationship (4) and as measured, are illustrated as by the response characteristics in FIG. 5, hereinabove.

Figure 15:
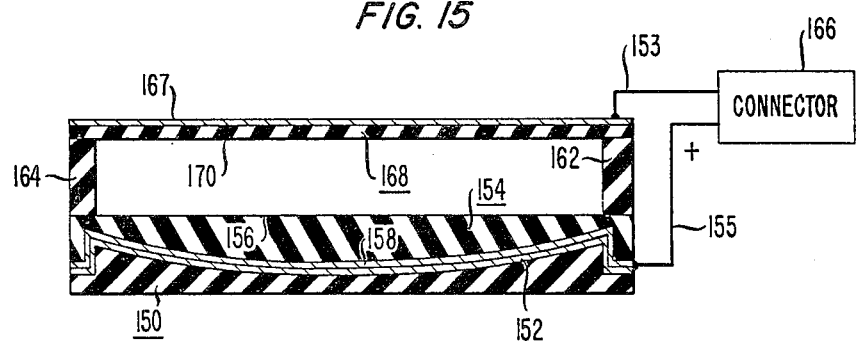

FIG. 15 shows another embodiment of the present invention in which the thickness of the electret foil 154 is selected to be a function of the displacement from the center $\xi$ along the length of the transducer according to relationships (1) and (2). The metal layer 158 of the electret foil 154 is in direct contact with the metal surface 152 of the backplate 150. The thickness of the backplate 150 is determined by the relationship $$1 - \frac{J_1[j\nu(1-\xi^2)^{\frac{1}{2}}]}{(1-\xi^2)^{\frac{1}{2}}J_1(j\nu)}, |\xi| \leq L \quad (8)$$

$$1 - K, L \leq |\xi| \leq 1 \quad (9)$$

A second foil 168 is suspended above the electret foil 154, supported by insulating elements 162 and 164. The distance between the second foil 168 and the polymer surface of the electret foil 156 is substantially constant along the length and width of the electret transducer. A neutral (or ground) electrical lead 153 is attached to the metal surface of the second foil 170, and a positive lead 155 is attached to the metal layers 158 and 152 which are in contact. The electrical leads 153 and 155 terminate at connector 166.

The sensitivity, i.e., $\psi(x)$, of the electret transducer of FIG. 15 expressed by the aforesaid relationship (3) at any point along the length of the electret transducer, is directly proportional to the thickness of the electret foil 154 at that point. The response characteristic is illustrated in FIG. 5.

Another embodiment of an electret transducer is realized by selecting the electrostatic charge, using known methods, on the polymer layer 14 of the electret foil 10 in FIG. 4 hereinabove to be a function of the displacement from the center $\xi$ along the length of the backplate according to relationships (1) and (2). The width of the metal layer, on the rough surface 16 of backplate 18, however, remains constant along the entire length of the backplate 18. Thus, instead of varying the width of the metal layer 16, the electrostatic charge on the polymer layer 14 may be varied. Alternatively, the electret foil 10 is placed directly in contact with the backplate 18 as shown in FIG. 6, and a second foil 66 placed over the electret foil. The sensitivity, $\psi(x)$, given by the aforesaid relationship (3), of the electret transducer at any point thereon is directly proportional to the electrostatic charge at that point. The response of the aforesaid electret transducer is substantially similar to the response characteristic shown in FIG. 5, hereinabove.

As stated hereinabove, it is known how to electrostatically charge an electret foil. One such method is disclosed in an article entitled, "Research in Polymer Electrets" by Messrs. G. M. Sessler and J. E. West, published by the Society of Photographic Scientists and Engineers at the Second International Conference on Electrophotography, pages 162–166 (1974).

Figure 16:
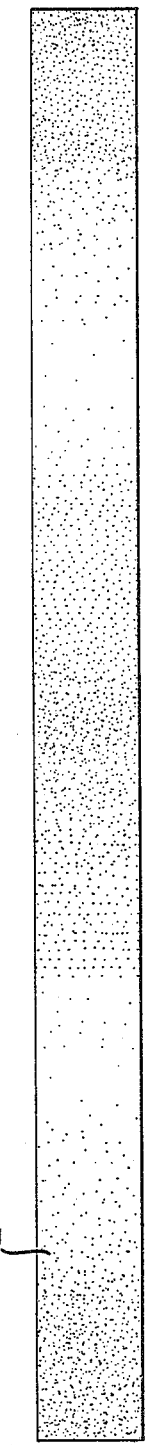
FIGS. 16, 17 and 18 show electrostatic charge distributions on the polymer surface of the electret foil in FIG. 1.

Referring to FIG. 16, there is shown an electrostatic charge distribution on the polymer surface 14 of electret foil 10 of FIG. 1. The electrostatic charge is distributed evenly along the entire width of the electret foil surface 14. The charge density, however, is selected to be a function of the displacement from the center $\xi$, along the length of the electret foil according to the aforesaid relationships (1) and (2). Furthermore, the sensitivity of the electret transducer, at any point thereon, is directly proportional to the electrostatic charge on the electret foil at that point. And, as stated by relationship (4) hereinabove, the response characteristic, shown above in FIG. 5, is dependent on the sensitivity of the electret transducer.

Figure 17:
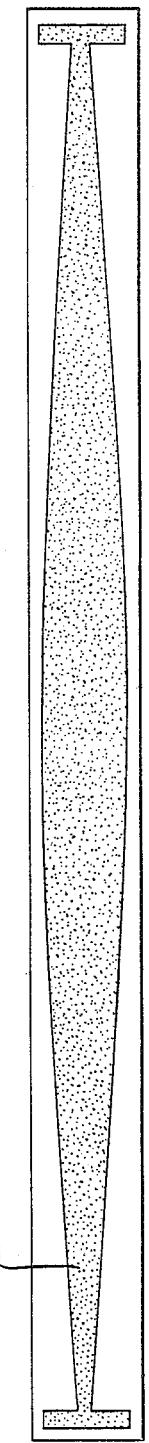

Referring to FIG. 17, there is shown a polymer surface such as polymer surface 14 of the electret foil 10, in FIG. 1 above, electrostatically charged by an alternate method. The electrostatic charge is distributed uniformly along a selected width, as in FIG. 16 above, with the charge varying along the length of the polymer surface 14. The width, however, of the electrostatically charged polymer surface 14 varies, along the length of the aforesaid relationships (1) and (2). The width of the electrostatically charged data, however, is not coextensive with the width of the polymer. The response characteristic obtained is effectively the same as before.

The electrostatic charge distribution described with reference to FIGS. 16 and 17 above relate to surface charges. In each case, the same charge distribution can be realized by depositing the electrostatic charge to different depths of the polymer layer of electret foil 10 in FIG. 1. The electrostatic charge $\sigma$ at any point is given by the relationship, $$\sigma = \frac{\epsilon \epsilon_o V}{\frac{d_1}{d} d} \quad (10)$$

where,
$\sigma$ = charge density,
$\epsilon$ = permittivity of polymer,
$\epsilon_o$ = permittivity of surrounding air,
$d_1$ = depth of electrostatic charge,
$d$ = thickness of polymer layer, and
$V$ = electrostatic voltage.

Figure 18:
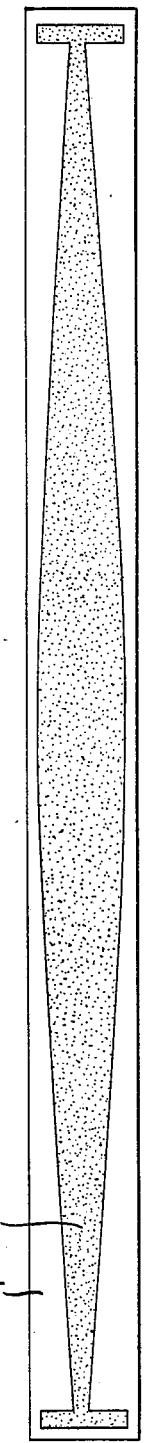

Referring to FIG. 18, there is shown yet another method of charging the aforesaid polymer surface of the electret foil. As in FIG. 16, a negative electrostatic charge within a selected area is selected to be a function of the displacement from the center $\xi$ along the length of the polymer layer in accordance with the aforesaid relationships (1) and (2). Unlike FIG. 17, however, in FIG. 18, the unchanged spaces on the polymer surface are now positively charged. The effect of charging the polymer surface with both negative and positive charges is to provide a clearly defined edge between the two charged areas. Thus, the sensitivity at any point on the transducer is more precise, being directly dependent on the electrostatic charge at that point. The response is highly directional, and as shown earlier in FIG. 5, comprises a main lobe and a plurality of sidelobes below a preselected threshold.

In three of the aforesaid embodiments wherein the metal width is varied, the actual air gap is varied, or the effective air gap is varied, the electret foil may be replaced by a foil with a direct current (d.c.) bias applied thereto. That is, instead of an electrostatic charge being deposited on the foil, a d.c. bias is provided continuously thereto from an external d.c. source.

Furthermore, two separate foils may be used: a foil comprising a metal layer and a polymer layer, or a foil made entirely of metal. Where a foil comprising a polymer layer and a metal layer is used, however, the metal layer must be placed adjacent to the backplate.

Additionally, the foil should not be placed directly on the backplate. Instead, the foil should be suspended over the backplate, such as by the use of insulating stops as elements 62,64 in FIG. 6.

The leads from the metal layer of the foil and the metal layer of the backplate may be interchanged in termination at the connector. That is, the polarity of the leads is irrelevant.

What is claimed is:

1. A directional acoustic transducer comprising:
   a backplate; and
   an electret foil;
   the electrostatic charge on said electret foil being selectively varied along the foil length symmetrically about its centerpoint to produce a transducer directional response pattern having a mainlobe surrounding said transducer with an axis of revolution along the length of said foil and a plurality of sidelobes in other directions, each sidelobe being at least a predetermined level below said mainlobe.

2. An acoustic transducer for producing a directional response pattern comprising a mainlobe and a plurality of sidelobes substantially at a predetermined threshold level, said transducer comprising:
   a backplate, and an electret foil, the electrostatic charge on said electret foil varying in proportion to the predetermined relationship $$\frac{J_1[j\nu(1-\xi^2)^{\frac{1}{2}}]}{(1-\xi^2)^{\frac{1}{2}}J_1(j\nu)}, |\xi| < L$$

$$K, L \leq |\xi| \leq 1$$

where
- $J_1$ = Bessel function of the first kind,
- $j = (-1)^{\frac{1}{2}}$,
- $\nu = \ln[r + (r^2-1)^{\frac{1}{2}}]$,
- r = ratio of amplitude of said mainlobe to said sidelobe threshold level,
- $\epsilon$ = normalized length of any point on said backplate from the center of said backplate, and
- L = normalized length of said backplate beyond which said electrostatic charge is a constant, K.

3. An acoustic transducer according to claim 2 wherein said electret foil comprises a metal layer and a polymer layer, a first area of said polymer layer being electrostatically charged with a negative charge with the width of said first area varying along the length of said polymer layer in accordance with said predetermined relationship, the remaining area of said polymer layer being electrostatically charged with a positive charge.

4. The acoustic transducer according to claim 2 wherein one surface of said backplate has a metallic coating.

5. The acoustic transducer according to claim 4 wherein said electret foil comprises a metal layer and a polymer layer, said polymer layer facing said metallic coated surface of said backplate.

6. The acoustic transducer according to claim 5 wherein said electrostatic charge is distributed along the length of said polymer layer according to said predetermined relationship.

7. The acoustic transducer according to claim 6 wherein the electrostatic charge at any point along the length of said polymer layer is uniform substantially along the entire width of said polymer layer at said point.

8. The acoustic transducer according to claim 6 wherein the electrostatic charge density at any point along the length of said polymer layer is substantially uniform along the entire width of said polymer layer at said point.

9. The acoustic transducer according to claim 8 wherein the electrostatic charge at any point along the length of said polymer layer is substantially the same at equal distances from and on opposite sides of a center line, parallel to the shorter side of said polymer layer.

10. A directional acoustic transducer comprising:
an electret foil of predetermined length and width; and
a metallized backplate for supporting said electret foil;
the electrostatic charge on said electret foil being selectively varied along the foil length symmetrically about its centerpoint to produce a transducer directional response pattern having a mainlobe surrounding said transducer with an axis of revolution along the length of said foil and a plurality of sidelobes in other directions, each sidelobe being at least a predetermined level below said mainlobe;
the electrostatic charge on said foil being uniform along the width of the foil at any point along its length.

11. A directional acoustic transducer comprising:
a backplate, one surface of said backplate being coated with a metal layer; a first electret foil having a metal layer surface, said first electret foil metal layer surface being fastened to said backplate so that the metal layer of said first electret foil is facing the metal layer coating of said backplate; and a second foil comprising a polymer layer and a metal layer, said second foil being suspended a predetermined distance from said first electret foil; the electrostatic charge on said first electret foil being selectively varied along the foil length symmetrically about its centerpoint to produce a transducer directional response pattern having a mainlobe surrounding said transducer with an axis of revolution along the length of said foil and a plurality of sidelobes in other directions, each sidelobe being at least a predetermined level below said mainlobe.

* * * * *

UNITED STATES PATENT AND TRADEMARK OFFICE
CERTIFICATE OF CORRECTION

PATENT NO. : 4,429,191

DATED : January 31, 1984

INVENTOR(S) : Ilene J. Busch-Vishniac, Robert L. Wallace, Jr., and James E. West It is certified that error appears in the above-identified patent and that said Letters Patent is hereby corrected as shown below:

In the Abstract, line 1, "producting" should read --producing--. Column 2, line 11, "charge" should read --charged--. Column 7, line 58, "vary" should be omitted. Column 8, line 50, should read $$-- 1 - \frac{J_1[j\nu(1-\xi^2)^{1/2}]}{(1-\xi^2)^{1/2} J_1(j\nu)}^{-1}, \quad |\xi| \leq L \quad (8) --.$$

Column 11, line 43, "uniform substantially" should read --substantially uniform--.

Signed and Sealed this

Twenty-sixth Day of March 1985

[SEAL]

Attest:

DONALD J. QUIGG

Attesting Officer

Acting Commissioner of Patents and Trademarks